United States Patent
Hartl et al.

(10) Patent No.: US 9,664,185 B2
(45) Date of Patent: May 30, 2017

(54) CONDENSATE SEPARATOR DEVICE FOR A COMPRESSOR ARRANGEMENT FOR THE PRODUCTION OF COMPRESSED AIR

(71) Applicant: KNORR-BREMSE SYSTEME FÜR SCHIENENFAHRZEUGE GMBH, Munich (DE)

(72) Inventors: Michael Hartl, Unterhaching (DE); Corneliu Popescu, Munich (DE); Christian Urra, Munich (DE); Manuel Lund, Murnau (DE)

(73) Assignee: KNORR-BREMSE SYSTEME FUR SCHIENENFAHRZEUGE GMBH (DE)

( * ) Notice: Subject to any disclaimer, the term of this patent is extended or adjusted under 35 U.S.C. 154(b) by 379 days.

(21) Appl. No.: 14/353,994

(22) PCT Filed: Oct. 26, 2012

(86) PCT No.: PCT/EP2012/071229
§ 371 (c)(1),
(2) Date: Apr. 24, 2014

(87) PCT Pub. No.: WO2013/060824
PCT Pub. Date: May 2, 2013

(65) Prior Publication Data
US 2014/0301873 A1    Oct. 9, 2014

(30) Foreign Application Priority Data
Oct. 27, 2011   (DE) .................. 10 2011 117 106

(51) Int. Cl.
*B01D 49/00*   (2006.01)
*F04B 7/00*   (2006.01)
(Continued)

(52) U.S. Cl.
CPC ............ *F04B 7/0076* (2013.01); *B01D 45/12* (2013.01); *B01D 45/16* (2013.01);
(Continued)

(58) Field of Classification Search
CPC .......... F04B 7/0076; F04B 39/16; F16T 1/14; Y10T 137/3105; B01D 53/261;
(Continued)

(56) References Cited

U.S. PATENT DOCUMENTS 3,327,456 A * 6/1967 Guber, Jr. ................ B04C 5/13
                                                  165/101
3,756,408 A * 9/1973 Spatz .................... B01D 61/12
                                                  210/96.1
(Continued)

FOREIGN PATENT DOCUMENTS

CN        2482593 Y     3/2002
DE        2053383 A1    11/1971
(Continued)

OTHER PUBLICATIONS

English Translation of Notification of the First Office Action and Search Report of counterpart Chinese Patent Application No. 201280052564.9 issued by the State Intellectual Property Office of P.R. China on Aug. 27, 2015.
(Continued)

*Primary Examiner* — Dung H Bui
(74) *Attorney, Agent, or Firm* — Barnes & Thornburg LLP

(57) ABSTRACT

A condensate separator device for a compressor arrangement for the production of compressed air having a separator housing that has a compressor-side inlet connection and an outlet connection for discharging the dehydrated compressed air. A base-side drainage valve is provided for releasing the condensate, which has collected in the sepa-
(Continued)

rator housing, into the surrounding environment via a release opening. The valve is pneumatically-piloted seat valve able to be controlled by an electro-pneumatic control valve, and this electro-pneumatic control valve of the drainage valve is arranged outside the separator housing and connected to a pilot connection of the drainage valve via a control pressure-line.

7 Claims, 1 Drawing Sheet

(51) Int. Cl.
*B01D 45/12* (2006.01)
*B01D 45/16* (2006.01)
*B01D 50/00* (2006.01)
*B01D 46/00* (2006.01)
*B01D 46/44* (2006.01)
*F04B 39/16* (2006.01)

(52) U.S. Cl.
CPC ......... *B01D 46/0086* (2013.01); *B01D 46/44* (2013.01); *B01D 50/002* (2013.01); *F04B 39/16* (2013.01)

(58) Field of Classification Search
CPC ...... B01D 45/16; B01D 45/12; B01D 50/002; B01D 46/0086; B01D 46/44; B60T 17/004; F04C 28/24
See application file for complete search history.

(56) References Cited

U.S. PATENT DOCUMENTS

| | | | |
|---|---|---|---|
| 4,018,579 A * | 4/1977 | Hofmann | A61C 1/0061 137/203 |
| 4,047,909 A * | 9/1977 | Hofmann | B01D 53/26 137/116.3 |
| 4,248,710 A * | 2/1981 | Rampignon | B01D 17/0202 210/104 |
| 4,564,374 A * | 1/1986 | Hofmann | A61C 17/046 210/104 |
| 4,642,033 A | 2/1987 | Boller | |
| 5,186,522 A | 2/1993 | Spencer | |
| 5,285,809 A * | 2/1994 | Shimoguri | F04B 39/16 137/203 |
| 5,535,595 A * | 7/1996 | Manz | B01D 5/0081 62/475 |
| 5,961,701 A * | 10/1999 | Hlynsky | B01D 45/12 55/355 |
| 6,790,346 B2 * | 9/2004 | Caleffi | A61C 17/046 209/719 |
| 9,115,821 B2 * | 8/2015 | Bauer | F16K 31/408 |
| 2004/0083893 A1 * | 5/2004 | Larsson | B60T 17/004 96/108 |
| 2004/0226879 A1 * | 11/2004 | Redding | B01D 21/2411 210/512.1 |
| 2006/0222515 A1 * | 10/2006 | Delmotte | F04B 25/00 417/228 |
| 2009/0314161 A1 * | 12/2009 | Al-Alusi | B01D 45/16 95/271 |
| 2010/0236653 A1 * | 9/2010 | Hilberer | B60T 17/004 137/870 |
| 2011/0047042 A1 * | 2/2011 | Blickhan | G06Q 10/06 705/26.25 |
| 2012/0040816 A1 * | 2/2012 | Thorwid | B04B 7/02 494/14 |
| 2012/0199523 A1 | 8/2012 | Bauer et al. | |
| 2013/0269301 A1 * | 10/2013 | Stroeder | B01J 8/0055 55/434.2 |
| 2015/0075381 A1 * | 3/2015 | Urra | B60T 17/004 96/130 |

FOREIGN PATENT DOCUMENTS

| | | |
|---|---|---|
| DE | 4323048 A1 | 2/1994 |
| DE | 4323005 A1 | 3/1994 |
| DE | 19646635 A1 | 5/1998 |
| DE | 69904522 T2 | 11/2003 |
| DE | 102009054064 A1 | 7/2011 |
| GB | 1392500 | 4/1975 |
| JP | 177830 | 5/1989 |

OTHER PUBLICATIONS

Search Report for German Patent Application No. 10 2011 117 106.5; Jul. 16, 2012.
Search Report for International Patent Application No. PCT/EP2012/071229; Mar. 13, 2013.
Notification Concerning Transmittal of International Preliminary Report on Patentability and Written Opinion of the International Search Authority for International Patent Application No. PCT/EP2012/071229 dated Oct. 26, 2012.
English Translation of Notification Concerning Transmittal of International Preliminary Report on Patentability and Written Opinion of the International Search Authority for International Patent Application No. PCT/EP2012/071229 dated Oct. 26, 2012.

* cited by examiner

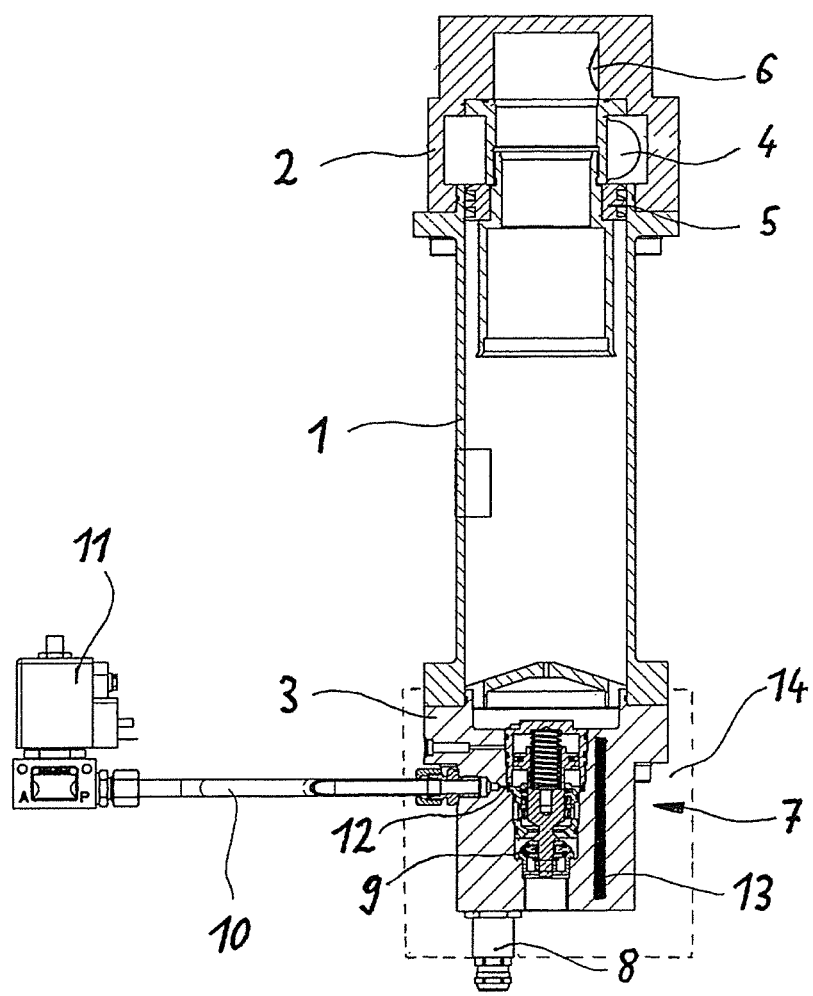

CONDENSATE SEPARATOR DEVICE FOR A COMPRESSOR ARRANGEMENT FOR THE PRODUCTION OF COMPRESSED AIR

PRIORITY CLAIM

This patent application is a U.S. National Phase of International Patent Application No. PCT/EP2012/071229, filed 26 Oct. 2012, which claims priority to German Patent Application No. 10 2011 117 106.5, filed 27 Oct. 2011, the disclosures of which are incorporated herein by reference in their entirety.

FIELD

Disclosed embodiments relate to a condensate separator device for a compressor arrangement for the production of compressed air, having a separator housing that has a compressor-side inlet connection as well as an outlet connection for discharging the dehydrated compressed air, wherein a base-side water drain valve is provided for draining off the condensate that has collected in the separator housing into the surroundings via a drainage aperture, the valve being designed as a pneumatically pilot-controlled seat valve that can be actuated by an electro-pneumatic control valve.

BACKGROUND

The sphere of disclosed embodiments extends primarily to vehicle manufacturing, in particular to rail vehicle manufacture. For supplying compressed air to braking systems in rail vehicles compressor arrangements having aftercooling devices are generally used. Water contained in the compressor air condenses in the after-cooling device. Water is delivered in droplet form to an air drier. Conventional air driers are designed to remove the gaseous water fraction from the compressed air. Water fractions in droplet form, on the other hand, must be removed from the compressed air upstream of the air drier. These liquid water fractions, however, have a tendency to freeze at low temperatures. Since the function of a condensate separator device connected to the inlet side of the air drier is aimed at separating the liquid phase from the compressed air, the risk of freezing is greatest at this point of the compressed air system. Attempts are generally made to fit heating elements at points where there is a risk of freezing. However, the condensate separator device is constantly cooled by the compressed air coming from the aftercooler. The area of the drainage aperture and the electrical actuating device, which is often embodied as a solenoid valve, has proved especially critical with regarding to freezing. Here the combination of the electrical actuating device with the condensate is particularly problematical. The condensate can get into the electrical actuating device via the actuating elements and can immediately disable this device or freeze up at the onset of low temperatures.

DE 10 2009 054 064 A1 discloses a condensate separator device of generic type. This comprises an oil/water separator with base-side condensate valve as water drain valve, which for opening and closing can be actuated by a solenoid valve, the outlet of which opens out in a condensate collector vessel.

The solenoid valve opens and closes the passage opening through which the condensate can flow outwards when in the opened state. Here the passage opening and the solenoid valve are fitted to the condensate separator device together as one assembly. When used in the low-temperature range without separate heating elements on the condensate separator device the condensate may freeze up.

BRIEF DESCRIPTION OF THE FIGURES

Disclosed embodiments are represented in more detail below with reference to the single drawing, in which:

FIG. 1 shows a perspective sectional representation of a condensate separator device with electro-pneumatic control valve installed at a location remote therefrom.

DETAILED DESCRIPTION OF THE DISCLOSED EMBODIMENTS

Disclosed embodiments provide a condensate separator device for a compressor arrangement for the production of compressed air, in which liquid condensate is prevented from getting into the drying area, to prevent electrical actuating devices from freezing up, especially at low outdoor temperatures.

Disclosed embodiments embrace the technical teaching that the electro-pneumatic control valve of the water drain valve is arranged outside the separator housing of the condensate separator device and is connected by way of a control pressure line to a pilot control connection of the inasmuch pneumatically pilot-controlled water drain valve.

In other words, the electrical actuating device, that is to say the electro-pneumatic control valve of the water drain valve, is arranged separately at a distance from the purely pneumatic components of the water drain valve. The water drain valve is actuated by an electronic control of the electro-pneumatic control valve.

The condensate collecting in the separator housing of the condensate separator device is in no way able to influence the electrical components of the condensate separator device, since the electro-pneumatic control valve can be arranged in an area of the compressed air production system which is always frost-free.

For feeding the electro-pneumatic control valve, use may be made of dry compressed air, which can be drawn from a downstream air drier device, or at least dehydrated compressed air, which is available on the outlet side of the condensate separator device. Dry or at least appropriately dehydrated compressed air is therefore always available to the water drain valve via the control pressure line, and the electrical actuating devices and the electronic components come into contact solely with dry or at least dehydrated compressed air, thereby affording an additional safeguard against freezing. The solution therefore systematically separates the function of condensate drainage from the separator housing from the electrical control function of the water drain valve.

According to at least one disclosed embodiment, the water drain valve is embodied as a piston valve and may be equipped with a conical valve seat. The moving valve mechanism of the water drain valve is thereby of particularly robust construction and less prone to freezing up.

According to a measure serving to enhance the disclosed embodiments, it is proposed that a heating device be incorporated in the area of the pneumatically pilot-controlled water drain valve. The heating device may be permanently supplied with electrical energy or supplied when the temperature falls below a minimum temperature to afford the area of the water drain valve additional protection against freezing. The heating device should be arranged in the closest possible spatial proximity to the moving valve mechanism of the water drain valve.

According to another disclosed embodiment the pneumatically pilot-controlled water drain valve with heating device is accommodated in a light-alloy base part of the cylindrical separator housing. The choice of material for the base part affords a beneficial transfer of the heat generated by the heating device to the water drain valve.

To prevent the heat generated by the heating device being dissipated into the surroundings, it is proposed that at least the base part of the separator housing be enclosed by a thermal insulation. Such thermal insulation may be composed of insulating shells, for example, which serve to wrap the separator housing as a whole or just the base part thereof. This has the advantage that the heat output of the heating device remains concentrated in the area of the separator housing and is not to a large extent radiated outwards via the surface of the separator housing. The design of the insulating shells may be such that the shells are divided, the insulating shells resting only partially on the metal surface of the separator housing. Air chambers are thereby produced, which are separated by webs to create an additional air insulation layer.

In addition to such a base part the optionally cylindrical separator housing may be closed at the opposite end face by a cover part. The compressor-side inlet connection and the outlet connection for discharging the dehydrated compressed air can be accommodated in such a cover part.

With such a design configuration there is scope for designing the separator housing as a cyclone separator of condensate contained in the compressed air. In a cyclone separator the compressor-side compressed air flowing into the separator housing via the inlet connection is swirled by a special ducting, so that the water droplets contained in the compressed air are thrown against the inside wall of the separator housing. From here these droplets run towards the base part, where they collect. The collected condensate is then drained off to the outside via the water drain valve.

According to a further disclosed embodiment, the separator housing is equipped with means for pulsation damping. This allows compressed air pulses, which are generated by an upstream piston compressor, to be damped in the separator housing. For the purpose of pulsation damping the volume of the separator housing is dimensioned as a function of the volumetric flow of the compressor, in such a way that the compressed air pulsation is significantly damped. In addition, compressed air baffle means may be incorporated in the separator housing to further increase the damping effect.

According to FIG. 1, a condensate separator device substantially comprises a cylindrical separator housing 1, which is closed towards the upper end face by a cover part 2 and towards the lower end face by a base part 3. The cover part 2 and the base part 3 are connected to the cylindrical separator housing 1 by a flanged connection.

In this exemplary embodiment the cylindrical separator housing 1 is designed as a cyclone separator. The compressed air flowing in on the compressor side by way of an inlet connection 4 is set in swirling motion by an annular channel structure 5, so that the water droplets contained in the compressed air collect on the inside wall of the separator housing 1 and flow off in the direction of the base part 3. The thereby dehydrated compressed air flows off via an outlet connection 6 arranged in the cover part 2, for feeding this air to an air drier device, not further represented.

The condensate collecting in the separator housing 1 in the area of the base part 3 is drained off to the surroundings via a base-side water drain valve 7 and a drainage aperture 8 on the outlet side.

The water drain valve 7 is designed as a seat valve and comprises a conical valve seat 9. The water drain valve 7 has a pneumatic pilot control, the control pressure of which is provided by an electro-pneumatic control valve 11 outside the separator housing 1 and connected via a control pressure line 10.

In this respect the electro-pneumatic control valve 1 is designed as a pilot valve and is arranged at a location remote from the separator housing 1, in such a way that it is situated in an area of the vehicle protected from freezing. The control pressure line 10 is connected to a pilot control connection 12 of the water drain valve 7. The electro-pneumatic control valve 11 is fed with dried compressed air, which is drawn from the air drier device, not further represented.

The base part 3 of the condensate separator device is furthermore equipped with a heating device 13, which is arranged, incorporated in the base part 3, in proximity to the water drain valve 7. To avoid dissipation of the heat generated by the heating device 13 into the surroundings, the base part 3 of the condensate separator device is clad with a thermal insulation 14, here represented only schematically. Here the thermal insulation 14 may be formed from two polystyrene half-shells, which can be fitted around the base part 3 of the condensate separator device, for example by bonding on. To further increase the thermal insulation effect, air chambers, which may be arranged in the areas adjacent to the base part 3, can be incorporated into the polystyrene half-shells. To protect the polystyrene half-shells from harmful external effects these can in turn be protected by a plastic casing.

The invention is not limited to the disclosed embodiments described hereinabove, modifications of this instead being feasible, which are included in the scope of the claims. Thus it is also possible, for example, for the water drain valve to be embodied as another type of valve.

LIST OF REFERENCE NUMERALS 1 separator housing
2 cover part
3 base part
4 inlet aperture
5 annular channel structure
6 outlet aperture
7 water drain valve
8 drainage aperture
9 valve seat
10 control pressure line
11 control valve
12 pilot control connection
13 heating device
14 thermal insulation

The invention claimed is:

1. A condensate separator device for a compressor arrangement for the production of compressed air, the device comprising:
   a separator housing that has a compressor-side inlet connection and
   an outlet connection for discharging dehydrated compressed air,
   wherein a water drain valve is provided in a base of the device for draining off the condensate that has collected in the separator housing into surroundings via a drainage aperture, the valve being a pneumatically pilot-controlled seat valve actuated by an electro-pneumatic control valve, wherein the electro-pneumatic control valve of the water drain valve is arranged outside the separator housing and is connected by a control pressure line to a pilot control connection of the water drain valve, wherein the separator housing is designed as a cyclone separator of condensate contained in the compressed air, and wherein at least the base part of the separator housing is clad by a thermal insulation.

2. The condensate separator device of claim 1, wherein the water drain valve is a piston valve.

3. The condensate separator device of claim 1, wherein the water drain valve is equipped with a conical valve seat.

4. The condensate separator device of claim 1, wherein a heating device is arranged in the area of the water drain valve.

5. The condensate separator device of claim 4, wherein the water drain valve with heating device is accommodated in a light-alloy base part of the cylindrical separator housing.

6. The condensate separator device of claim 1, wherein the compressor-side inlet connection and the outlet connection for discharging the dehydrated compressed air are accommodated in a cover part of the separator housing.

7. The condensate separator device of claim 1, wherein the separator housing is equipped with means for pulsation damping.

* * * * *